US006583210B2

(12) United States Patent
Zanzig et al.

(10) Patent No.: US 6,583,210 B2
(45) Date of Patent: Jun. 24, 2003

(54) TIRE HAVING TREAD WITH CO-EXTRUDED NON-BLACK COLORED OVERLAY

(75) Inventors: David John Zanzig, Uniontown, OH (US); George Frank Balogh, North Canton, OH (US); Paul Harry Sandstrom, Tallmadge, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 105 days.

(21) Appl. No.: 09/775,218

(22) Filed: Feb. 1, 2001

(65) Prior Publication Data

US 2002/0143095 A1 Oct. 3, 2002

(51) Int. Cl.$^7$ .................................................. C08K 3/04
(52) U.S. Cl. ...................... 524/492; 524/115; 524/128; 524/145; 524/152; 524/153; 152/209.5; 152/905
(58) Field of Search .............................. 524/115, 117, 524/127, 128, 139, 145, 152, 492, 493; 525/332.5, 332.9, 333.4, 333.5; 152/152.1, 209.5, DIG. 2

(56) References Cited

U.S. PATENT DOCUMENTS

| 3,768,537 A | * | 10/1973 | Hess et al. ................... 152/330 |
| 3,814,160 A | * | 6/1974 | Creasey ....................... 152/330 |
| 3,833,040 A | | 9/1974 | Bins ............................ 152/330 |
| 5,094,829 A | | 3/1992 | Krivak et al. ................ 423/339 |
| 5,283,285 A | * | 2/1994 | Akkapeddi et al. ........... 525/67 |
| 5,708,069 A | | 1/1998 | Burns et al. ................. 524/403 |
| 5,750,610 A | | 5/1998 | Burns et al. ................. 524/434 |
| 5,789,514 A | | 8/1998 | Burns et al. ................. 528/12 |
| 6,044,882 A | * | 4/2000 | Crawford et al. ........ 152/152.1 |
| 6,174,951 B1 | * | 1/2001 | Scholl ......................... 524/492 |
| 6,274,655 B1 | * | 8/2001 | Wideman et al. ............ 524/188 |

FOREIGN PATENT DOCUMENTS

| DE | 9102607 | 3/1991 | ........... B60C/13/00 |
| EP | 0667251 | 2/1995 | ........... B60C/11/00 |
| EP | 0682071 | 11/1995 | ............. C08L/9/00 |
| GB | 2232492 | 12/1990 | ........... B60C/11/24 |
| JP | 61146605 | 7/1986 | ........... B60C/11/00 |
| WO | WO 99/31178 A1 | * | 6/1999 |
| WO | 9931178 | 6/1999 | ........... C08L/23/28 |

OTHER PUBLICATIONS

"Recycling, Oil to Silicon", Kirk–Othmer *Encyclopedia of Chemical Technology*, 4$^{th}$ Edition, vol. 21. 1997.

* cited by examiner

Primary Examiner—Edward J. Cain
Assistant Examiner—Katarzyna W. Lee
(74) Attorney, Agent, or Firm—Henry C. Young, Jr.

(57) ABSTRACT

The present invention relates to a tire with a carbon black-containing, black-colored, circumferential tread of a cap/base construction, wherein said tread cap has a lug and groove configuration and wherein the outer surface of a major portion of said grooves are designed to be ground contacting, and a co-extruded thin outer non-carbon black-containing rubber layer of a non-black color wherein said outer rubber layer is integral with and circumferentially extends from the axial outer edge of said tread cap to include at least of a visible surface of at least one groove in said tread cap. In one aspect, said tread contains a pair of black colored, carbon black reinforced, tread miniwings which extend from the axial outer edge of the tread over a portion of the tire sidewall, wherein said thin outer rubber layer joins said miniwing and wherein said tread cap, tread base, tread miniwings and thin outer layer are co-extruded, co-cured and therefore integral with each other.

17 Claims, 5 Drawing Sheets

TIRE HAVING TREAD WITH CO-EXTRUDED NON-BLACK COLORED OVERLAY

FIELD OF THE INVENTION

The present invention relates to a tire with a carbon black-containing, black-colored, circumferential tread of a cap/base construction, wherein said tread cap has a lug and groove configuration and wherein the outer surface of a major portion of said grooves are designed to be ground contacting, and a co-extruded thin outer non-carbon black-containing rubber layer of a non-black color wherein said outer rubber layer is integral with and circumferentially extends from the axial outer edge of said tread cap to include at least of a visible surface of at least one groove in said tread cap. In one aspect, said tread contains a pair of black colored, carbon black reinforced, tread miniwings which extend from the axial outer edge of the tread over a portion of the tire sidewall, wherein said thin outer rubber layer joins said miniwing and wherein said tread cap, tread base, tread miniwings and thin outer layer are co-extruded, co-cured and therefore integral with each other.

BACKGROUND OF THE INVENTION

Tire treads are conventionally of rubber compositions which contain at least some carbon black reinforcement and are thereby black in color. For various reasons, it may desired to provide a tire with a tread of which at least a portion of the tread has a color which contrasts with the primary black color of the tire and therefore does not contain carbon black reinforcement.

Historically, a tire with a silica reinforced tread which contains only a minimal amount of carbon black reinforcement, if any, and which contains a co-extruded carbon black-containing thin outer rubber layer on its outer tread surface to serve as an electrically conductive path for static electricity for such tread has been proposed according to U.S. Pat. No. 6,044,882. Realistically, such tread may be black in color if it does contain only a minimal amount of carbon black or it may be of a non-black color if it does not contain carbon black. Therefore, conceivably such tread may be of a non-black color whereas the aforesaid thin outer rubber layer is of a black color and may extend from a tread miniwing. In such manner, then, a tire might be provided with a tread of which a part of its visible portion is of a color other than black.

Also historically, a typical example of a component of a tire having a color which contrasts with the conventional black color of the tire is a tire sidewall in which a portion of the rubber is white in color resulting from a blend of rubber and titanium dioxide pigment in the absence of, or exclusive of, particulate carbon black reinforcement. Tires with white colored portions of their sidewalls are well known.

However, it is appreciated that coloring pigments such as titanium dioxide do not provide significant rubber reinforcement equivalent to rubber reinforcing carbon black. Therefore, such tire components are conventionally limited to rubber compositions which do not need such a high degree of reinforcement.

It is also appreciated that such colored rubber compositions which contains a coloring pigment such as titanium dioxide have a tendency to discolor as a result of various discoloring chemicals which may be contained in various rubber compositions which are adjacent to the colored rubber composition. Accordingly, it is a common practice to use substitute non-discoloring chemicals for discoloring chemicals in such adjacent rubber compositions such as for example, non-discoloring antidegradants and non-discoloring rubber processing oils. Such practice is well known in the tire white sidewall art.

For this invention, it is desired to provide a tire having a tread having a portion which is of a visible color which contrasts with black-colored carbon black reinforced rubber and which does not require a majority of the outer surface of the tire which is intended to be ground-contacting to be of such contrasting color, and to thereby avoid especially compounding such contrastingly colored tread segments the surface of the tire intended to be ground-contacting have a wear and traction substantially equivalent to the black-colored carbon black reinforced tread rubber composition.

Thus, it is desired that such coloration for a portion of the tread be located primarily in the tread grooves and is primarily exclusive of the outer surface of a tread lug designed to be ground contacting.

In the description of this invention, the terms "rubber" and "elastomer" if used herein, may be used interchangeably, unless otherwise prescribed. The terms "rubber composition", "compounded rubber" and "rubber compound", if used herein, are used interchangeably to refer to "rubber which has been blended or mixed with various ingredients and materials" and such terms are well known to those having skill in the rubber mixing or rubber compounding art.

In the description of this invention, the term "phr" refers to parts of a respective material per 100 parts by weight of rubber, or elastomer. The terms "rubber" and "elastomer" may be used interchangeably unless otherwise indicate. The terms "cure" and "vulcanize" may be used interchangeably unless otherwise indicated.

SUMMARY AND PRACTICE OF THE INVENTION

In accordance with this invention, a pneumatic tire is provided having a multi-colored tread of a cap/base construction and a lug and groove construction wherein a visible portion of said grooves have walls of a non-black colored, devoid of carbon black, silica reinforced, rubber composition wherein and a majority of the visible portion of the surface of said tread is of a black-colored, carbon black-containing, rubber composition wherein said tread is comprised of co-extruded laminae of (A) a layer of a carbon black-containing, black colored tread cap rubber composition configured with lugs and grooves wherein the outer surface, or face, said tread lugs are designed to be ground-contacting, (B) a layer of a carbon black-containing, black-colored tread base which underlies said tread cap and is not designed to be ground contacting, (C) a pair of carbon black-containing, black-colored tread miniwings extending from the peripheral edges of said tread, and (D) at least one thin overlaying layer of said non-black colored, silica reinforced, outer rubber layer, exclusive of carbon black and containing a colorant other than of a black color, overlaying at least a portion of the surface of said at least a portion of said tread grooves.

In one aspect of the invention, said thin overlay rubber strip (1) is positioned exclusively on at least a portion of the surface of at least a portion of said tread grooves and wherein a majority of the visible surface of the tread surface is of a black colored, carbon black containing, rubber composition, or (2) is abraded away from the face of said lugs intended to be ground-contacting, or (3) extends between the peripheral edge of said tread and said tread wings, or (4) is positioned as a plurality of said co-extruded overlaying, non-black colored rubber strips are positioned over at least a portion of a plurality of the surface of said tread grooves exclusive of the face of said grooves intended to be ground-contacting.

In the practice of this invention, said thin, non-black colored co-extruded overlay rubber layer is comprised of (A) 100 phr of elastomer comprised of
(1) about 20 to about 100, alternately about 50 to about 90, phr of at least one diene-based elastomer and
(2) from zero to about 80, alternately about 10 to about 50, phr of a halogenated copolymer of isobutylene and p-methyl styrene, wherein said halogen is selected from bromine or chlorine, preferably bromine, (B) about 25 to about 100, alternately about 35 to about 90, phr of silica comprised of particulate synthetic amorphous silica selected from at least one of
(1) aggregates of precipitated silica having hydroxyl groups (e.g. silanol groups) on the surface thereof, and
(2) pre-hydrophobated aggregates of precipitated silica having been pre-hydrophobated by treating silica in an aqueous colloidal form thereof with both an organomercaptosilane and an alkylsilane in a weight ratio of said organomercaptosilane to said alkylsilane in a range of from 10/90 to 90/10;
wherein said alkylsilane is of the general Formula (I)

$$X_n\text{—Si—}R_{4-n} \tag{I}$$

wherein R is an alkyl radical having from one to 18, preferably from one to 8, carbon atoms such as, for example, methyl, ethyl, isopropyl, n-butyl and octadecyl radicals, n is a value of from 1 to 3 and X is a radical selected from halogen, namely chlorine or bromine, preferably a chlorine radical, and alkoxy radicals, preferably an alkoxy radical as $(OR^1)$—, wherein $R^1$ is an alkyl radical having from one to 3 carbon atoms such as, for example, methyl, ethyl and isopropyl radicals, preferably from methyl and ethyl radicals, and where said organomercaptosilane is of the general formula (II):

$$(X)_n(R^2O)_{3-n}\text{—Si—}R^3\text{—SH} \tag{II}$$

wherein X is a radical selected from halogen, namely chlorine or bromine, preferably a chlorine radical, and alkyl radicals having from one to 16, preferably from one to 4, carbon atoms, preferably selected from methyl, ethyl, n-propyl and n-butyl radicals; wherein $R^2$ is an alkyl radical having from one to 16, preferably from one to 4 carbon atoms, preferably selected from methyl and ethyl radicals and $R^3$ is an alkylene radical having from one to 16, preferably from one to 4, carbon atoms, preferably a propylene radical; n is a value from zero to 3, preferably zero;

(3) about 0 to about 15, alternately about 1 to about 10, phr of a coupling agent having a moiety reactive with hydroxyl groups contained on the surface of said aggregates of precipitated silica and another moiety interactive with said diene-based elastomer(s);

(4) about 0.5 to about 20, alternatively about 2 to about 15, phr of an organo phosphite where said elastomer includes said halogenated copolymer, as at least one of organo diphosphites selected from diisodecyl pentearythritol diphosphite, distearyl pentaerythritol diphosphite and pentearythritol diphosphite and organo monophosphites selected from the general formulas (III) and (IV):

$$(OR^4)\text{—P—}(OR)^4 \text{, and} \atop (OR^4) \tag{III}$$

$$((OR^4)_2\text{—P—O—}R^5)_2\text{—}R^6 \tag{IV}$$

wherein each $R^4$ radical is independently selected from alkyl radicals and phenyl radicals and alkyl substituted phenyl radicals; wherein said $R^4$ alkyl radicals have from 1 to 18 carbon atoms, preferably from 1 through 4 or from 4 through 12, carbon atoms, and preferably selected from methyl, ethyl, propyl radicals, from propyl, butyl, octyl and ethylhexyl radicals or from phenyl radicals; wherein said alkyl radicals for said alkyl substituted phenyl radicals have from 3 to 9 carbon atoms, wherein $R^5$ is a phenyl radical; and wherein $R^6$ is selected from alkyl radicals having from 2 to 8 carbon atoms preferably selected from ethyl, propyl and butyl radicals;

wherein said organo phosphite is preferably selected from the organo phosphites of said formula (I);

wherein said organo phosphite is provided by one or more of the following:

(a) by mixing said organo phosphite with said elastomer(s) and said synthetic silica, preferably in an internal rubber mixer, (b) by pre-reacting said halogenated copolymer of isobutylene and p-methyl styrene with said organo phosphite prior to blending said reinforcing filler therewith, (c) by pre-reacting said organo phosphite with an aqueous dispersion of colloidal silica particles from which a precipitated silica is recovered to form an organo phosphite/silica composite thereof, (d) mixing said organo phosphite with said elastomer(s) and said synthetic silica, preferably in an internal rubber mixer, according to any of said steps (a), (b) or (c) wherein said synthetic silica includes at least one of said pre-hydrophobated silica aggregates which has been pre-hydrophobated prior to mixing with said elastomers, (e) mixing said organo phosphite with said elastomer(s) and an alkylsilane of the said Formula (I) with said elastomer(s) and said synthetic silica, preferably in an internal rubber mixer, and (f) by pre-reacting said organo phosphite and said alkylsilane of Formula (I) with
(i) said aggregates of synthetic precipitated silica or
(ii) an aqueous dispersion of colloidal silica particles from which a precipitated silica is recovered to form a silica composite thereof.

In the practice of this invention, said coupling agent for said aggregates of precipitated silica may preferably be, for example, an alkoxysilyl polysulfide such as for example, a bis(3-trialkoxysilylalkyl) polysulfide wherein alkyl radicals for said alkoxy groups are selected from one or more of methyl and ethyl radicals, preferably an ethyl radical and the alkyl radical for said silylalkyl component is selected from butyl, propyl and amyl radicals, preferably a propyl radical and wherein said polysulfide component contains from 2 to 8, with an average of from 2 to 2.6 or from 3.5 to 4, sulfur atoms in its polysulfidic bridge.

Representative of such other coupling agents are, for example, bis(3-triethoxysilylpropyl) polysulfide having an average of from 2 to 2.6 or from 3.5 to 4, sulfur atoms in its polysulfidic bridge.

Such coupling agent may, for example, be added directly to the elastomer mixture or may be added as a composite of precipitated silica and such coupling agent formed by treating a precipitated silica therewith or by treating a colloidal silica therewith and precipitating the resulting composite.

In one aspect of the invention, said non-black colored rubber composition is preferably devoid of rubber processing oil other than paraffinic rubber processing oil which contains less than 14 weight percent aromatic compounds and is preferably devoid of antidegradants other than phenolic antidegradants, and also preferably contains said brominated poly(isobutylene-co-para-methylstyrene) compound.

In practice, a purpose of said coupling agent is to aid in enabling said amorphous silica to reinforce the rubber composition. For example, such coupling agent may be a coupling agent having a moiety reactive with hydroxyl groups contained on the surface of the amorphous silica (e.g. silanol groups) and another moiety interactive with at least one of said diene-based elastomers. Alternatively, said coupling agent may be contained on the silica itself wherein the silica has been pretreated with a coupling agent prior to its addition to the rubber composition.

Representative of such brominated poly(isobutylene-co-para-methylstyrene) copolymers is Exxpro 3745 from the ExxonMobil Chemical Company. In practice, a purpose of said coupling agent is to aid in enabling said amorphous silica to reinforce the rubber composition, although in a case where said pre-hydrophobated silica inherently contains a coupling agent, use of an additional coupling agent is not believed to be necessary. For example, such coupling agent may be a coupling agent having a moiety reactive with hydroxyl groups contained on the surface of the amorphous silica (e.g. silanol groups) and another moiety interactive with at least one of said diene-based elastomers. Alternatively, said coupling agent may be contained on the silica itself wherein the silica has been pretreated with a coupling agent prior to its addition to the rubber composition.

In practice, the pre-hydrophobated precipitated silica aggregates might be recovered, for example, from said treated colloidal silica, for example as a treated silica hydrosol, with the aid of acid addition to the treated colloidal silica (for example, sulfuric acid or hydrochloric acid) followed by water washing and drying the recovered hydrophobated silica as a hydrophobated silica gel or as a hydrophobated precipitated silica. While this invention is not intended to be directed to a specific preparation technique (preparation of silica hydrosols, recovery of silica gels and precipitated silicas, etc.) of the pre-hydrophobated precipitated silica itself, for education purposes in this regard, reference might be made to the *Encyclopedia of Chemical Technology,* Fourth Edition (1997), Volume 21, Kirk-Othmer in Pages 1020 through 1026 and U.S. Pat. No. 5,094,829 as well as U.S. Pat. Nos. 5,708,069, 5,789,514 and 5,750,610 for a more detailed discussion.

Representative alkylsilanes of Formula (I) are, for example, trichloro methyl silane, dichloro dimethyl silane, chloro trimethyl silane, trimethoxy methyl silane, dimethoxy dimethyl silane, methoxy trimethyl silane, trimethoxy propyl silane, trimethoxy octyl silane, trimethoxy hexadecyl silane, dimethoxy dipropyl silane, triethoxy methyl silane, triethoxy propyl silane, triethoxy octyl silane, and diethoxy dimethyl silane.

Representative examples of organomercaptosilanes of Formula (II), namely organomercaptosilanes are, for example, triethoxy mercaptopropyl silane, trimethoxy mercaptopropyl silane, methyl dimethoxy mercaptopropyl silane, methyl diethoxy mercaptopropyl silane, dimethyl methoxy mercaptopropyl silane, triethoxy mercaptoethyl silane, and tripropoxy mercaptopropyl silane.

Representative examples of organo phosphites understood to be commercially available are, for example, triisodecyl phosphite, trilauryl phosphite, tris(tridecyl) phosphite, diphenyl isooctyl phosphite, diphenyl isodecyl phosphite, phenyl diisodecyl phosphite, triphenyl phosphite, triisononylphenyl phosphite, trimethyl phosphite, triethyl phosphite, tris (2-chloroethyl) phosphite, triisopropyl phosphite, tributyl phosphite, triisooctyl phosphite and tris (2-ethylhexyl) phosphite, as well as tris (2,4-di-t-butylphenyl) phosphite, and bis 2,4,6,tri-t-butylphenyl 2-butyl-2-ethyl-1,3-propanediol phosphite; and diphosphites as, for example, distearyl pentaerythritol diphosphite, bis (2,4-di-t-butylphenyl) pentaerythritol diphosphite, bis (2,6, di,t-butyl-4-methylphenyl pentaerythritol diphosphite, bis (2,4-dicumylphenyl) pentaerythritol diphosphite and mixtures thereof.

Such organo phosphite may be, for example, tris (2-ethylhexyl) phosphite or triphenyl phosphite.

It is preferred that an in situ reaction of said organo phosphite and silica, optionally including the alkylsilane of formula (I), within the elastomer host may be accomplished without an evolution of an alcohol as compared to using the aforesaid alkoxysilyl polysulfide coupling agent by the inherent chemistry of the organo phosphite material and hydroxyl groups contained on the surface of said silica material in which water evolved instead of an alcohol as a byproduct of the reaction.

In the further practice of the invention, the aforesaid in situ reaction of said organo phosphite silica material within the elastomer host via said internal rubber mixing process is accomplished wherein said silica material is a precipitated silica and/or silica-containing carbon black which is hydrophobated prior to its addition to the elastomer (pre-hydrophobated). Such in situ reaction is considered herein to be important as to both the process of mixing and reacting of the organo phosphite and pre-hydrophobated silica material as to a resulting product thereof. In particular, is it considered herein that pre-hydrophobation of the silica material, particularly with an alkyl silane of the general formula (I) enables a more efficient mixing, or processing, of it within the elastomer host in that such pre-hydrophobation of the silica material (A) renders it more compatible with the diene-based elastomer and (B) substantially reduces a tendency for a precipitated silica to agglomerate with itself within the elastomer host.

In the practice of this invention, said pre-hydrophobated precipitated silica aggregates may be pre-hydrophobated, for example, by treating silica in an aqueous colloidal form thereof with said alkylsilane of Formula (I).

In another aspect of the invention, said elastomer composition for said non-black colored tread rubber layer(s) and for rubber composition(s) in direct contact with said non-black colored tread rubber layer(s) of is preferably devoid of rubber processing oil other than paraffinic rubber processing oils which contains less than 8 weight percent aromatic compounds and is preferably devoid of antidegradants other than phenolic antidegradants and is thus devoid of amine based antidegradants.

For further understanding of the invention, a drawing is presented to depict a tire with tread of a cap/base construction which is composed of lugs and grooves in which an exposed surface of at least one groove is of a color in contrast to black.

BRIEF DESCRIPTION OF THE DRAWINGS

In particular.

FIG. 2 references the tire by numeral (1), the tread cap layer with its lugs and grooves by numeral (3), the tread base layer by numeral (4) and an outer rubber strip layer by numeral (9). FIG. 5 also indicates the tire sidewalls (12) and beads (13).

Figure 1:
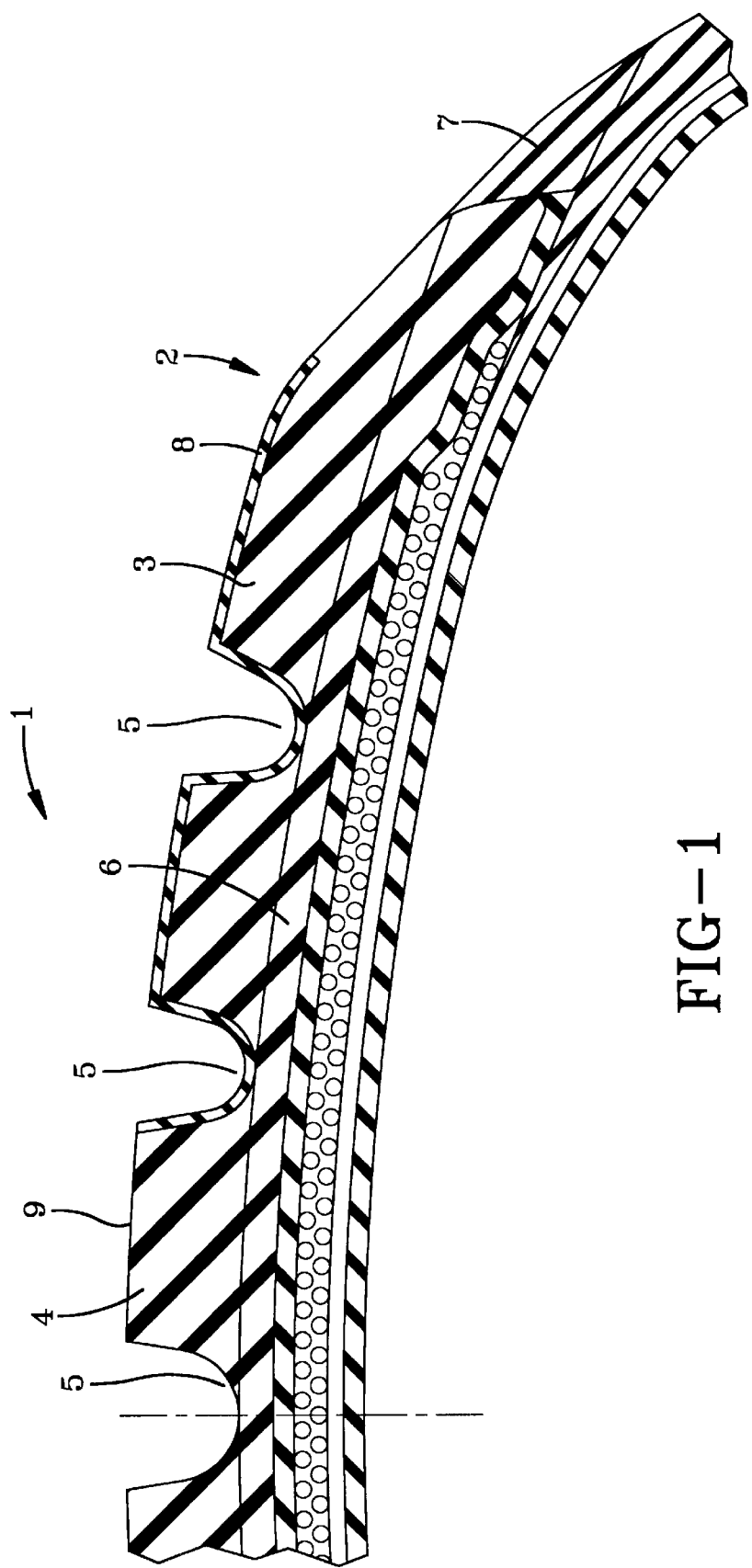
FIG. 1 is a cross-sectional view of a portion of a tire 1 with as tread 2 of a co-extruded cap/base construction with a tread cap layer 3 configured with lugs 4 and grooves 5 and an underlying tread base layer 6 together with co-extruded tread wings 7 and co-extruded thin rubber strip layer 8 (co-extruded overlay) extending over a portion of the outer surface 9 (lug face) of the tread lugs designed to be ground contacting wherein said outer strip layer 8 may extend over the outer surface of said tread wings 7, or may extend between said tread cap layer 3 and said tread wings 7 and thereby exclusive of the outer surface of said tread wings 7 or may simply be depicted as shown in FIG. 1. Said tread cap layer 3, tread base layer 6 and said tread wings 7 are of carbon black-containing rubber compositions and therefore of a black color. Said rubber strip layer 8 (co-extruded overlay) is exclusive of carbon black and is of a non-black color.
Figure 2:
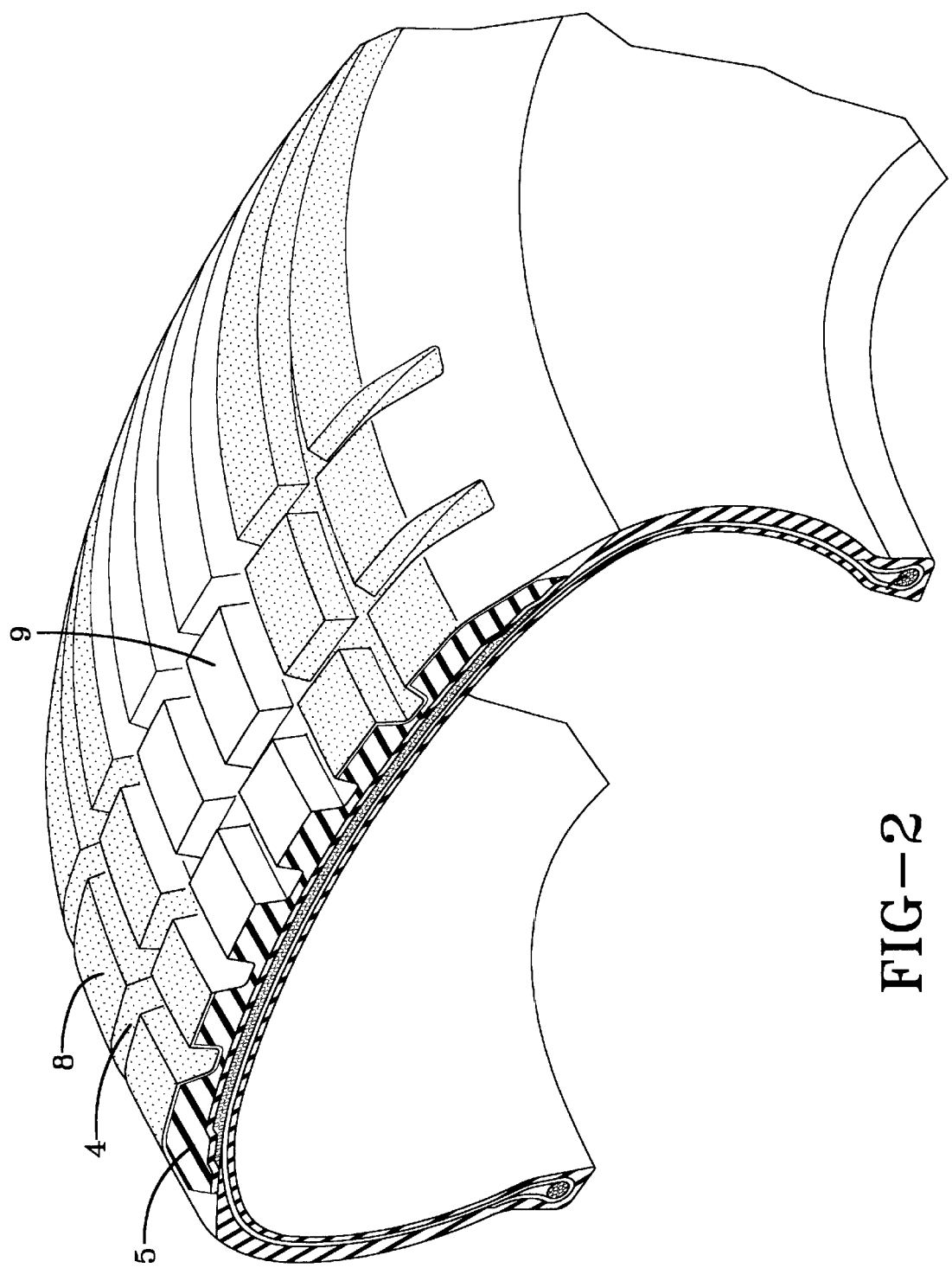
FIG. 2 depicts the tread of FIG. 1 wherein said co-extruded, thin, non-black colored overlaying rubber strip 8 extends over the face 9 of the tread lugs 5 to at least a portion of the surface of the grooves 4.
Figure 3:
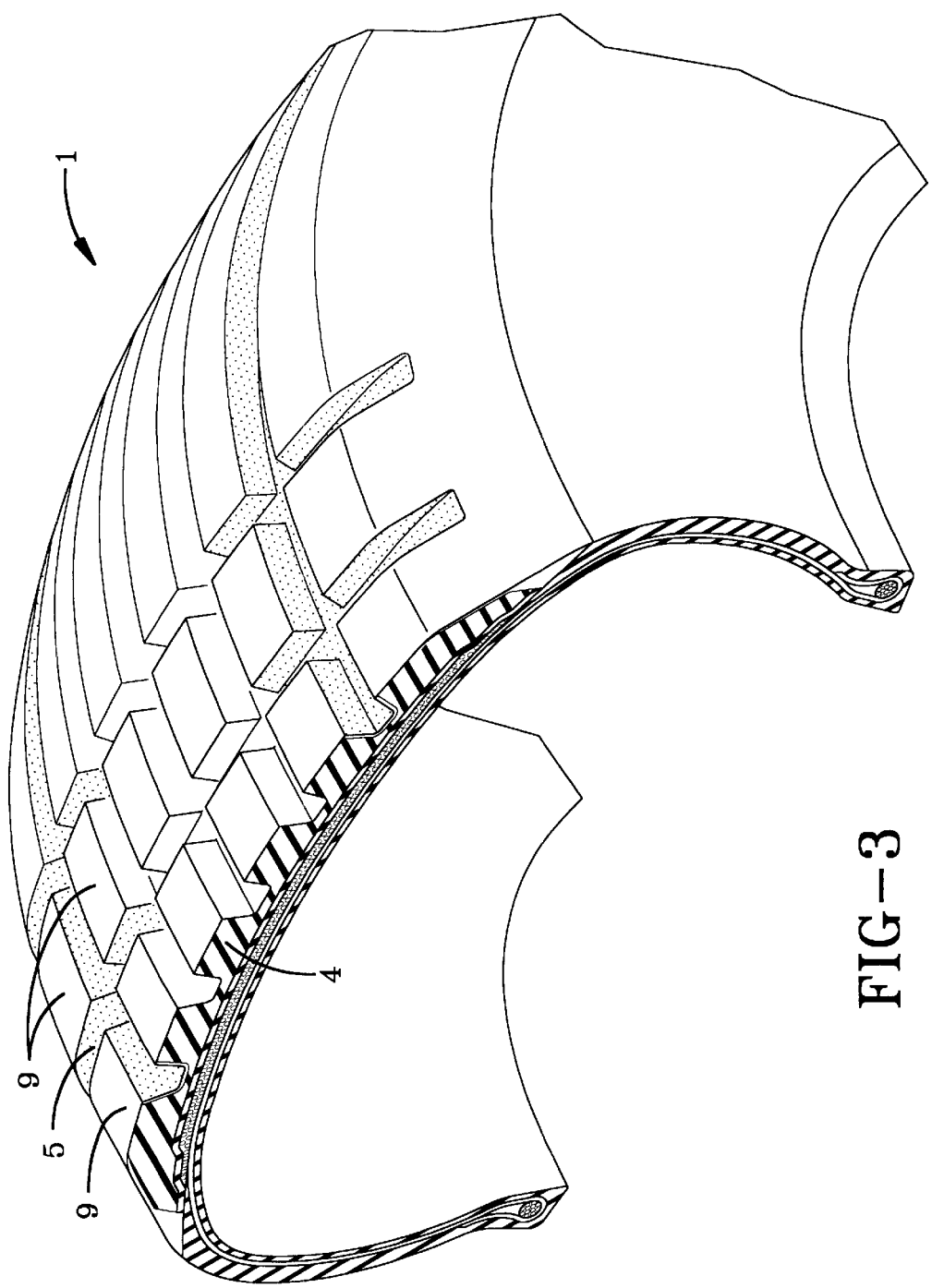
FIG. 3 depicts the tire tread of FIG. 2 wherein the said non-black colored rubber layer 8, as shown in FIG. 2, does not include cover the face 9 of the tread lugs 4. For such purpose, said tread may be so-manufactured or said overlay 8 is abraded or otherwise worn away to expose the face 9 of the lugs 4 and to therefore cause the non-black colored layer 8 to be confined to the surface of the tread grooves 5.
Figure 4:
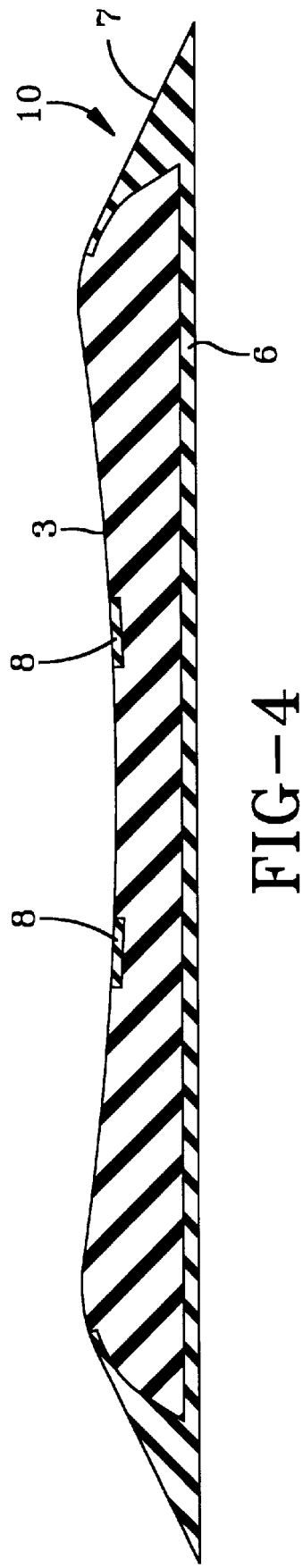
FIG. 4 depicts a cross-sectional view of an extruded tread strip 10 prior to building it onto a tire carcass to be molded and vulcanized. In particular, the tread strip 10 is composed of a tread cap portion 3 and a base layer 6 together with tread wings 7, all of which are of black colored, carbon black-containing rubber compositions. Positioned in, rather than on, said tread cap portion 3 is at least one visible (e.g. two) thin, non-black colored, exclusive of carbon black, rubber strips 8 is (are) even (flushed) with the surface of the tread cap 3.
Figure 5:
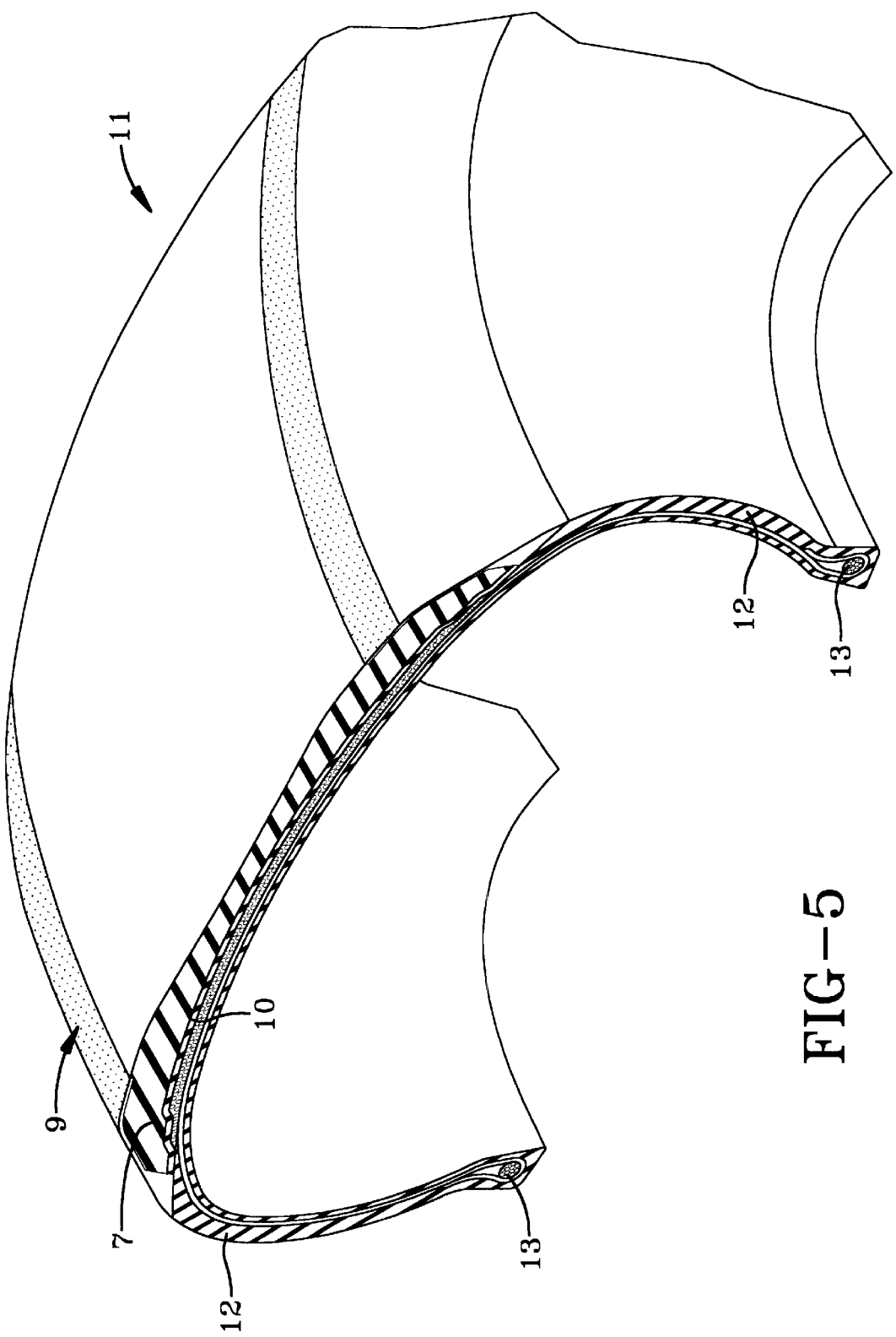
FIG. 5, similar to FIG. 2, depicts a cross-sectional view of a tire (11) with a tread cap layer (7), tread base layer (10) and outer rubber strip layers (9).

It is to be appreciated that the prepared rubber composition may be appropriately extruded through a suitable extruder die to form a shaped rubber stock, such as for example a tread stock strip, the rubber stock (e.g. read strip) built onto a tire carcass and the resulting assembly vulcanized in a suitable tire mold at a temperature in a range of about 130° C. to about 160° C. to form a tire.

Therefore, in one aspect of the invention the rubber composition for said overlay layer 8 rubber composition is prepared in a sequential series of at least two separate and individual preparatory internal rubber mixing steps, or stages, in which the diene-based elastomer is first mixed with the prescribed silica in the absence of carbon black, in a subsequent, separate mixing step and followed by a final mixing step where curatives are blended at a lower temperature and for a substantially shorter period of time.

It is conventionally required after each mixing step that the rubber mixture is actually removed from the rubber mixer and cooled to a temperature in a range of about 50° C. to about 20° C. and then added back to an internal rubber mixer for the next sequential mixing step, or stage.

The forming of a tire component is contemplated to be by conventional means such as, for example, by extrusion of rubber composition to provide a shaped, unvulcanized rubber component such as, for example, a tire tread. Such forming of a tire tread is well known to those having skill in such art.

It is understood that the tire, as a manufactured article, is prepared by shaping and sulfur curing the assembly of its components at an elevated temperature (e.g. 140° C. to 180° C.) and elevated pressure in a suitable mold. Such practice is well known to those having skill in such art.

The diene-based elastomers for the tire tread rubber composition of this invention, are, for example, homopolymers and copolymers of at least one conjugated diene such as, for example, isoprene and/or 1,3-butadiene and copolymers of at least one conjugated diene, such as for example, isoprene and/or 1,3-butadiene, and a vinyl aromatic compound such as styrene or alphamethyl styrene, preferably styrene.

Representative of such diene-based elastomers are, for example, elastomers comprised of cis 1,4-polyisoprene (natural and synthetic), cis 1,4-polybutadiene, high vinyl polybutadiene having a vinyl 1,2-content in a range of about 35 to about 90 percent, isoprene/butadiene copolymer elastomers, styrene/isoprene copolymer elastomers, styrene/butadiene copolymer elastomers (organic solvent solution polymerization formed or prepared and aqueous emulsion polymerization formed or prepared), and styrene/isoprene/butadiene terpolymer elastomers.

Amorphous silicas are usually aggregates of precipitated silicas although they may be fumed silicas. Precipitated silicas are, for example, those obtained by the acidification of a soluble silicate, e.g., sodium silicate, including blends of a sodium silicate and aluminate. Such precipitated silicas are well known to those having skill in such art.

Such amorphous, particularly aggregates of precipitated, silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society,* Volume 60, Page 304 (1930).

The silica may also be typically characterized by having a dibutylphthalate (DBP) absorption value in a range of about 100 to about 400, and more usually about 150 to about 300 cm$^3$/100 g (ASTM2414).

The silica is conventionally used in conjunction with an adhesive agent (coupling agent) as hereinbefore discussed to aid in coupling the silica to at least one of said diene based elastomers and, thus, enhance the elastomer reinforcing effect of the silica. The coupler may be mixed in the same mixing stage with the silica or in a subsequent preparatory mixing stage except that it is preferred that the silica is added to the rubber composition prior to the coupling agent. In practice, then the coupling agent then combines in-situ with the silica within the elastomer host.

Various colorants might be used for the non-black colored rubber composition used in this invention, if desired. For example, such colorants might be pigments, classified according to CAS numbers, for example, red 38 CAS 6358-87-8; violet 32 CAS 12225-0800; blue 15 CAS 147-14-8, copper phthalocyanine; blue 29, CAS 57455-37-5, ultramarine blue; violet 19 CAS 1047-16-1; yellow 110 CAS 106276-80-6, yellow 109 CAS 106276-79-3; and white 6 CAS 13463-67-7, titanium dioxide.

It is readily understood by those having skill in the art that the rubber composition would be compounded by methods generally known in the rubber compounding art, such as mixing the various sulfur-vulcanizable constituent rubbers with various commonly used additive materials, as herein before discussed, such as, for example, curing aids such as sulfur, activators, retarders and accelerators, processing additives, such as rubber processing oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

Representative of phenolic antidegradants for use in this invention are, for example, antioxidants such as polymeric hindered phenol, Wingstay® HLS available from The Goodyear Tire & Rubber Company, including phenolic antidegradants disclosed in *The Vanderbilt Rubber Handbook* (1978), Pages 344 through 346. Other non-staining antidegradants such as poly(oxyalkylene) amine known as OZONOX RP-2 available from Sovereign Chemical Company and cyclic acetal known as Vulkazone AFS available from Bayer A.G., can be considered part of this invention.

Representative non-aromatic rubber processing oils for use in this invention, namely such oils which contain less than 15 weight percent aromatic compounds, if at all, are, and for example, contain 46 percent to 51 percent content and 36 percent to 42 percent naphthenic content.

Typical amounts of fatty acids, if used which can include stearic acid, comprise about 0.5 to about 3 phr. Typical amounts of zinc oxide comprise about 1 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr, with a range of from about 1.5 to about 2.5, sometimes from about 2 to about 2.5, being preferred.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 2, phr. In another embodiment, combinations of a primary and a secondary accelerator might be used with the secondary accelerator being used in smaller amounts (of about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The mixing of the rubber composition can preferably be accomplished by the aforesaid sequential mixing process. For example, the ingredients may be mixed in at least three stages, namely, at least two non-productive (preparatory) stages followed by a productive (final) mix stage. The final curatives are typically mixed in the final stage which is conventionally called the "productive" or "final" mix stage in which the mixing typically occurs at a temperature, or ultimate temperature, lower than the mix temperature(s) of the preceding non-productive mix stage(s). The terms "non-productive" and "productive" mix stages are well known to those having skill in the rubber mixing art.

EXAMPLE I

In this Example, a rubber composition which contained carbon black reinforcement, thereby of a black color, and a rubber composition which contained silica reinforcement, exclusive of carbon black and containing a purple colorant and thereby of a purple color were prepared by mixing the ingredients in an internal rubber mixer in a sequential series of non-productive (without sulfur and accelerators) mixing steps and a final productive (with sulfur and accelerator addition at a lower mix temperature) mixing step.

For the carbon black-containing rubber composition, a total of two non productive mixing steps were used and for the silica reinforced rubber composition, a total of three non-productive mixing steps were used. The rubber compositions were dumped from the rubber mixer after each mixing step, sheeted out from an open mill and allowed to cool to below 40° C. after each mixing step.

The representative rubber compositions shown in the following Table 1 where Sample A (with carbon black reinforcement) is used as a comparative Control Sample and Sample B utilizes the silica reinforcement together with a paraffinic rubber processing oil, non-staining phenolic antioxidant and a silica coupling agent.

The non-productive mixing steps were for about 5 minutes to a temperature of about 160° C. The productive mixing step was for about 2 minutes to a temperature of about 115° C.

Table 1 illustrates the ingredients used for preparing the rubber compositions of Samples A and B.

TABLE 1

|  | Control Sample A | Sample B |
|---|---|---|
| First Non-Productive Mixing Step (to 160° C.) | | |
| Styrene/butadiene rubber[1] | 0 | 80 |
| Polybutadiene rubber[2] | 0 | 20 |
| Styrene/butadiene rubber[3] | 96.25 | 0 |
| Budene 1254[4] | 37.5 | 0 |
| Carbon black[5] | 70 | 0 |
| Silica[6] | 0 | 50 |
| Coupling Agent[7] | 0 | 3.9 |
| Aromatic processing oil | 10 | 0 |
| Paraffinic processing oil | 0 | 20 |
| Antioxidant[8] | 0 | 2 |
| Zinc oxide | 2 | 2 |
| Fatty acid[9] | 2 | 3 |

TABLE 1-continued

|  | Control Sample A | Sample B |
|---|---|---|
| Second Non-Productive Mixing Step (to 160° C.) | No | Yes |
| Silica[6] | 0 | 20 |
| Coupling agent[7] | 0 | 1.6 |
| Paraffinic processing oil | 0 | 8 |
| Productive Mixing Step (to 115° C.) | | |
| Accelerator(s)[10] | 1.3 | 3.5 |
| Sulfur | 1.5 | 1.4 |
| Antidegradant(s)[11] | 1.2 | 0 |
| Colorant (purple)[12] | 0 | 2 |

[1]Emulsion polymerization prepared styrene/butadiene rubber obtained as Plioflex 1502 from The Goodyear Tire & Rubber Company
[2]Cis 1,4-polybutadiene rubber obtained as Budene 1207 from The Goodyear Tire & Rubber Company
[3]Oil extended emulsion polymerization prepared styrene/butadiene rubber obtained as Plioflex 1712 from The Goodyear Tire & Rubber Company
[4]Oil extended cis 1,4-polybutadiene rubber obtained as Budene 1254 from The Goodyear Tire & Rubber Company
[5]N234 carbon black, an ASTM designation
[6]Obtained as Zeopol ® 8745 from the J. M. Huber Corporation
[7]Obtained as liquid Si69 from Degussa AG, as a bis-(3-triethoxysilylpropyl)tetrasulfide
[8]Non-staining antioxidant Wingstay ® HLS from The Goodyear Tire & Rubber Company
[9]Primarily stearic acid
[10]Sulfenamide and diphenylguanidine or tetramethylthiuram disulfide type
[11]Mixed diaryl-p-phenylenediamine type antioxidant from The Goodyear Tire & Rubber Company
[12]Colorant obtained from Akrochem Corporation An aromatic rubber processing oil was used which can be characterized as 40 percent to 41 percent aromatic, 21 percent to 26 percent naphthenic and 34 percent to 38 percent paraffinic. A paraffinic rubber processing oil was used which can be characterized as 46 percent to 51 percent paraffinic, 36 percent to 42 percent naphthenic and 11 percent to 14 percent aromatic.

The rubber compositions of Table 1 were cured for about 14 minutes at about 160° C. Various resulting physical properties are shown in the following Table 2.

TABLE 2

|  | Sample A | Sample B |
|---|---|---|
| Rheometer, 160° C. | | |
| Maximum torque, (dNm) | 12 | 14 |
| Minimum torque, (dNm) | 2.5 | 1.4 |
| Delta torque, dNm (Max-min torque) | 9.5 | 12.6 |
| T90, minutes | 6.2 | 8.6 |
| Stress Strain (Modulus) | | |
| 100% modulus (MPa) | 1.2 | 1.4 |
| 300% modulus (MPa) | 4.7 | 6.1 |
| Tensile strength (MPa) | 17.4 | 18.6 |
| Elongation at break, (%) | 689 | 628 |
| Rebound | | |
| 100° C. | 47 | 59 |
| Hardness | | |
| Shore A, 100° C. | 48 | 51 |
| DIN Abrasion (10 N force) (cm³ loss) | 73 | 91 |

It is seen from Table 2 that Sample B, a purple colored sample, has superior 300 percent modulus, hardness and rebound as compared to Control Sample A. These are considered herein to be important properties for a thin, co-extruded rubber strip which overlays at least a portion of a visible surface of a tread groove.

EXAMPLE II

A rubber tire is prepared having a tread of a cap/base construction with a lug and groove configuration wherein a thin rubber non-black and exclusive of carbon black strip is co-extruded therewith said tread as an overlay which covers at least a portion of a visible surface of a tread groove and is of the rubber composition of Sample B of Example I.

EXAMPLE III

In this Example, Control Sample A of Example I is reported as it was in Example I which contained carbon black reinforcement without silica reinforcement and, also therefore without a silica coupling agent.

Samples C and D are reported herein as rubber samples which contain a brominated copolymer of isobutylene and para-methyl stryene rubber (also referred to as "BIMS" rubber as well as at least one diene-based elastomer and silica reinforcement.

Sample D also contained an organo phosphite, namely triphenyl phosphite, as a coupling agent for said BIMS.

For the Sample A carbon black-containing rubber composition, a total of two non productive mixing steps were used (Example I) and for the silica reinforced rubber compositions (Samples C and D) a total of three non-productive mixing steps were used. The rubber compositions were dumped from the rubber mixer after each mixing step, sheeted out from an open mill and allowed to cool to below 40° C. after each mixing step.

The representative rubber compositions shown in the following Table 1 where Sample A (with carbon black reinforcement) is used as a comparative Control Sample and Samples C and D utilized the silica reinforcement together with a paraffinic rubber processing oil, non-staining phenolic antioxidant.

The non-productive mixing steps were for about 5 minutes to a temperature of about 160° C. The productive mixing step was for about 2 minutes to a temperature of about 115° C.

Table 1 illustrates the ingredients used for preparing the rubber compositions of Samples A (from Example I), C and D.

TABLE 3

|  | Control Sample A | Sample C | Sample D |
|---|---|---|---|
| First Non-Productive Mixing Step (to 160° C.) | | | |
| BIMS rubber[1] | 0 | 40 | 40 |
| Polybutadiene rubber[2] | 0 | 30 | 30 |
| Polyisoprene rubber | 0 | 30 | 30 |
| Styrene/butadiene rubber[3] | 96.25 | 0 | 0 |
| Budene 1254[4] | 37.5 | 0 | 0 |
| Carbon black[5] | 70 | 0 | 0 |
| Silica6 | 0 | 66 | 66 |
| Aromatic processing oil | 10 | 0 | 0 |
| Paraffinic processing oil | 0 | 25 | 25 |
| Zinc oxide | 2 | 0 | 0 |
| Fatty acid[7] | 2 | 0 | 0 |
| Phosphite[8] | 0 | 0 | 10 |
| Second Non-Productive Mixing Step (160° C.) | No | Yes | Yes |
| Zinc Oxide | 0 | 2.5 | 2.5 |
| Antidegradants[9] | 0 | 3.0 | 3.0 |
| Carbon black[10] | 0 | 10 | 10 |

TABLE 3-continued

| | Control Sample A | Sample C | Sample D |
|---|---|---|---|
| Productive Mixing Step (to 115° C.) | | | |
| Accelerator(s)[11] | 1.3 | 3.5 | 3.5 |
| Sulfur | 1.5 | 2.2 | 2.2 |
| Antidegradant(s)[12] | 1.2 | 0 | 0 |

[1]Brominated copolymer of isobutylene and para-methyl stryene rubber obtained as Exxpro 3745 from The Exxon Mobil Chemical Company
[2]Cis 1,4-polybutadiene rubber obtained as Budene 1207 from The Goodyear Tire & Rubber Company
[3]Oil extended emulsion polymerization prepared styrene/butadiene rubber obtained as Plioflex 1712 from The Goodyear Tire & Rubber Company
[4]Oil extended cis 1,4-polybutadiene rubber obtained as Budene 1254 from The Goodyear Tire & Rubber Company
[5]N234 carbon black, an ASTM designation
[6]Obtained as Zeopol ® 8715 from the J. M. Huber Corporation
[7]Primarily stearic acid
[8]Triphenyl phosphite
[9]P-phenylenediamine type
[10]N472 carbon black, an ASTM designation, obtained as Vulcan XC-72 from Cabot Corporation
[11]Sulfenamide and diphenylguanidine or tetramethyithiuram disulfide type
[12]Mixed diaryl-p-phenylenediamine type antioxidant from The Goodyear Tire & Rubber Company An aromatic rubber processing oil was used which can be characterized as 40 percent to 41 percent aromatic, 21 percent to 26 percent naphthenic and 34 percent to 38 percent paraffinic. A paraffinic rubber processing oil was used which can be characterized as 46 percent to 51 percent paraffinic, 36 percent to 42 percent naphthenic and 11 percent to 14 percent aromatic.

The rubber compositions of Table 3 were cured for about 14 minutes at about 160° C. Various resulting physical properties are shown in the following Table 4, with the physical properties for Sample A simply taken from Table 2 of Example I.

TABLE 4

| | Sample A | Sample C | Sample D |
|---|---|---|---|
| Stress Strain (Modulus) | | | |
| 100% modulus (MPa) | 1.2 | 1.6 | 1.2 |
| 300% modulus(MPa) | 4.7 | 8.5 | 4.8 |
| Tensile strength (MPa) | 17.4 | 11.5 | 10.9 |
| Elongation at break, (%) | 689 | 417 | 617 |
| Rebound | | | |
| 100° C. | 47 | 67 | 49 |
| Hardness | | | |
| Shore A, 100° C. | 48 | 51 | 51 |
| DIN Abrasion (10 N force) (cm$^3$ loss) | 73 | 172 | 132 |
| Peel Adhesion (95° C.), N | 170 | 38 | 159 |

From Table 4 it is seen that moduli, rebound and hardness values for Sample C, which included the BIMS polymer and silica, are improved over the Sample A values which is indicative of improved tire handling an rolling resistance for tires having treads of such composition.

From Table 4 it is also seen that tear strength as measured in a peel adhesion test and abrasion resistance or Sample D are improved as compared to Sample C which is indicative of improved durability of the rubber composition. Moreover, the properties of Sample D are very similar to Sample A (e.g. modulus, elongation at break, rebound and peel adhesion) indicating good compatibility for Sample A and D rubber compositions when positioned next to each other in an article of manufacture such as, for example a tire.

While various embodiments are disclosed herein for practicing the invention, it will be apparent to those skilled in this art that various changes and modifications may be made therein without departing from the spirit or scope of the invention.

What is claimed is:

1. A pneumatic tire having a multi-colored tread of a cap/base construction and a lug and groove construction wherein a visible portion of said grooves have walls of a non-black colored, devoid of carbon black, silica reinforced, rubber composition wherein and a majority of the visible portion of the surface of said tread is of a black-colored, carbon black-containing, rubber composition wherein said tread is comprised of co-extruded laminae of (A) a layer of a carbon black-containing, black colored tread cap rubber composition configured with lugs and grooves wherein the outer surface, or face, said tread lugs are designed to be ground-contacting, (B) a layer of a carbon black-containing, black-colored tread base which underlies said tread cap and is not designed to be ground contacting, (C) a pair of carbon black-containing, black-colored tread miniwings extending from the peripheral edges of said tread, and (D) at least one thin overlaying layer of said non-black colored, silica reinforced, outer rubber layer, exclusive of carbon black and containing a colorant other than of a black color, overlaying at least a portion of the surface of said at least a portion of said tread grooves;

wherein said thin, non-black colored outer rubber layer is comprised of 100 phr of elastomer comprised of
(1) about 50 to about 100 phr of at least one diene-based elastomer and
(2) from zero to about 50 phr of a halogenated copolymer of isobutylene and p-methyl styrene, wherein said halogen is selected from bromine or chlorine, (B) about 25 to about 100 phr of silica comprised of particulate synthetic amorphous silica selected from at least one of
(1) aggregates of precipitated silica having hydroxyl groups on the surface thereof, and
(2) pre-hydrophobated aggregates of precipitated silica having been pre-hydrophobated by treating silica in an aqueous colloidal form thereof with both an organomercaptosilane and an alkylsilane in a weight ratio of said organomercaptosilane to said alkylsilane in a range of from 10/90 to 90/10;

wherein said alkylsilane is of the general Formula (I)

$$X_n\!-\!Si\!-\!R_{4-n} \quad\quad\quad (I)$$

wherein R is an alkyl radical having from one to 18 carbon atoms, n is a value of from 1 to 3 and X is a radical selected from chlorine or bromine or alkoxy radical as (OR$^1$)—, wherein R$^1$ is an alkyl radical selected from methyl and ethyl radicals, and where said organomercaptosilane is of the general formula (II):

$$(X)_n(R^2O)_{3-n}\!-\!Si\!-\!R^3\!-\!SH \quad\quad\quad (II)$$

wherein X is a radical selected from chlorine, bromine, and alkyl radicals having from one to 16 carbon atoms; wherein R$^2$ is an alkyl radical having from one to 16 carbon atoms and R$^3$ is an alkylene radical having from one to 16 carbon atoms; and n is a value from zero to 3;

(3) from zero to about 15 phr of a coupling agent having a moiety reactive with hydroxyl groups contained on the surface of said aggregates of precipitated silica and another moiety interactive with said diene-based elastomer(s);

(4) about 0.5 to about 20 phr of an organo phosphite, where said elastomer includes said halogenated copolymer, as at least one of organo diphosphites selected from diisodecyl pentearythritol diphosphite, distearyl pentaerythritol diphosphite and pentearythritol diphosphite and organo monophosphites selected from the general formulas (III) and (IV):

$((OR^4)_2{-}P{-}O{-}R^5)_2{-}R^6$ (IV)

wherein each $R^4$ radical is independently selected from alkyl radicals and phenyl radicals and alkyl substituted phenyl radicals; wherein said $R^4$ alkyl radicals have from 1 to 18 carbon atoms, wherein $R^5$ is a phenyl radical; and wherein $R^6$ is selected from alkyl radicals having from 2 to 8 carbon atoms;

wherein said organo phosphite is provided by one or more of the following:
(a) by mixing said organo phosphite with said elastomer(s) and saic synthetic silica in an internal rubber mixer,
(b) by pre-reacting said hydrogenated copolymer of isobutylene and p-methyl styrene with said organo phosphite prior to blending said reinforcing filler therewith,
(c) by pre-reacting said organo phosphite with an aqueous dispersion of colloidal silica particles from which a precipitated silica is recovered to form an organo phosphite/silica composite thereof,
(d) mixing said organo phosphite with said elastomer(s) and said synthetic silica according to any of said steps (a), (b) or (c) wherein said synthetic silica includes at least one of said pre-hydrophobated silica aggregate. which has been pre-hydrophobated prior to mixing with said elastomers,
(e) mixing said organo phosphite with said elastomer(s) and an alkylsilane of the said Formula (I) with said elastomer(s) and said synthetic silica, preferably in an internal rubber mixer, and
(f) pre-reacting said organo phosphite and said alkylsilane of Formula (I) with
(i) said aggregates of synthetic precipitated silica or
(ii) an aqueous dispersion of colloidal silica particles from which a precipitated silica is recovered to form a silica composite thereof.

2. The tread of claim 1 wherein said outer rubber layer is abraded away from the face of said tread lugs designed to be ground-contacting.

3. The tread of claim 1 where said co-extruded overlaying non-black colored rubber layer is positioned exclusively on at least a portion of the surface of at least a portion of said tread grooves and wherein a majority of the visible surface of the tread surface is of a black colored, carbon black containing, rubber composition.

4. The tire of claim 3 wherein said overlaying, non-black colored, rubber strip extends between the peripheral edge of said tread and said tread wings.

5. The tire of claim 3 wherein a plurality of said co-extruded overlaying, non-black colored rubber strips are positioned over at least a portion of a plurality of the surface of said tread grooves exclusive of the face of said grooves intended to be ground-contacting.

6. The tire of claim 1 wherein said black colored, underlying rubber layer is comprised of 100 phr of elastomer comprised of
(A) about 50 to about 90 phr of at least one diene-based elastomer and
(B) about 10 to about 50 phr of a halogenated copolymer of isobutylene and p-methyl styrene, wherein said halogen is bromine.

7. The tire of claim 3 wherein said silica is comprised of aggregates of precipitated silica having hydroxyl groups on the surface thereof.

8. The tire of claim 3 wherein said silica is comprised of pre-hydrobated aggregates of precipitated silica having been pre-hydrobated by treating silica in an aqueous colloidal form therof with both an organomercaptosilane and an alkylsilane in a weight ratio of said organomercaptosilane to said alkylsilane in a range of from 10/90 to 90/10;

wherein said alkylsilane is of the general Formula (I)

wherein R is an alkyl radical selected from methyl, ethyl, isopropyl, n-butyl and octadecyl radicals, n is a value of from 1 to 3 and X is selected from a chlorine radical or an alkoxy radical as $(OR^1){-}$, wherein $R^1$ is selected from methyl and ethyl and where said organomercaptosilane is of the general formula (II):

wherein X is selected from a chlorine radical or an alkyl radical selected from at least one of methyl, ethyl, n-propyl and n-butyl radicals, wherein $R^2$ is an alkyl radical selected from methyl and ethyl radicals and $R^3$ is an akylene radical having from one to 4 carbon atoms, and n is a value from zero to 3.

9. The tire of claim 3 wherein said coupling agent for said aggregates of precipitated silica is a bis(3-trialkoxysilylalkyl) polysulfide wherein alkyl radicals for said alkoxy groups are selected from one or more of methyl and ethyl radicals and the alkyl radical for said silylalkyl component is selected from butyl and propyl radicals, and wherein said polysulfide component contains from 2 to 8, with an average of from 2 to 2.6 or from 3.5 to 4, sulfur atoms in its polysulfidic bridge.

10. The tire of claim 1 wherein said coupling agent is bis(3-triethoxysilylpropyl) polysulfide having an average of from 3.5 to 4 sulfur atoms in its polysulfidic bridge.

11. The tire of claim 1 wherein said coupling agent is added to the elastomer as a composite of precipitated silica and such coupling agent formed by treating a precipitated silica therewith or by treating a colloidal silica therewith and precipitating the resulting composite.

12. The tire of calim 3 wherein said coupling agent is exclusive of silane based coupling agents and contains a moiety which does not provide an alcohol byproduct upon reaction with said hydroxyl groups contained on the surface of said silica.

13. The tire of claim 3 wherein said pre-hydrophobated precipitated silica aggregates are be recovered from said treated colloidal silica as a treated silica hydrosol, with the aid of acid addition to the treated colloidal silica followed by water washing and drying the recovered hydrophobated silica as hydrophobated precipitated silica.

14. The tire of claim 3 wherein said alkylsilanes of Formula (I) are selected from at least one trichloro methyl silane, dichloro dimethyl silane, chloro trimethyl silane, trimethoxy methyl silane, dimethoxy dimethyl silane, methoxy trimethyl silane, trimethoxy propyl silane, trimethoxy octyl silane, trimethoxy hexadecyl silane, dimethoxy dipropyl silane, triethoxy methyl silane, triethoxy propyl silane, triethoxy octyl silane, and diethoxy dimethyl silane.

15. The tire of claim 3 wherein said silica couplers of Formula (II), namely organomercaptosilanes are selected from at least one of triethoxy mercaptopropyl silane, trimethoxy mercaptopropyl silane, methyl dimethoxy mercaptopropyl silane, methyl diethoxy mercaptopropyl silane, dimethyl methoxy mercaptopropyl silane, triethoxy mercaptoethyl silane, and tripropoxy mercaptopropyl silane.

16. The tire of claim 3 wherein said organo phosphites of formula (III) are selected from at least one of triisodecyl phosphite, trilauryl phosphite, tris(tridecyl) phosphite, diphenyl isooctyl phosphite, diphenyl isodecyl phosphite, phenyl diisodecyl phosphite, triphenyl phosphite, triisononylphenyl phosphite, trimethyl phosphite, triethyl phosphite, tris (2-chloroethyl) phosphite, triisopropyl phosphite, tributyl phosphite, triisooctyl phosphite and tris (2-ethylhexyl) phosphite, tris (2,4-di-t-butylphenyl) phosphite, and bis 2,4,6,tri-t-butylphenyl 2-butyl-2-ethyl-1, 3-propanediol phosphite, distearyl pentaerythritol diphosphite, bis (2,4-di-t-butylphenyl) pentaerythritol diphosphite, bis (2,6,di,t-butyl-4-methylphenyl pentaerythritol diphosphite, bis (2,4-dicumylphenyl) pentaerythritol diphosphite and mixtures thereof.

17. The tire of claim 3 wherein said elastomer composition for said non-black colored tread rubber layer(s) and for rubber composition(s) in direct contact with said non-black colored tread rubber layer(s) are devoid of rubber processing oil other than paraffinic rubber processing oils which contain less than 16 weight percent aromatic compounds and is devoid of amine based antidegradants.

* * * * *